United States Patent [19]

Fujita et al.

[11] 4,295,080

[45] Oct. 13, 1981

[54] SYSTEM FOR CONTROLLING ROTATIONAL DIRECTION SWITCHOVER AND FOR VARIABLY CONTROLLING ROTATIONAL SPEED OF MOTOR

[75] Inventors: Mitsuo Fujita; Koji Matsumura, both of Yokohama, Japan

[73] Assignee: Victor Company of Japan, Ltd., Yokohama, Japan

[21] Appl. No.: 94,437

[22] Filed: Nov. 15, 1979

[30] Foreign Application Priority Data

Nov. 15, 1978 [JP] Japan ................. 53-139850

[51] Int. Cl.³ ............................. H02P 5/06
[52] U.S. Cl. .................... 318/257; 318/55; 318/293; 318/313; 318/336
[58] Field of Search ............... 318/55, 54, 257, 65, 318/258–260, 268, 283, 293, 311, 313, 326–329, 336

[56] References Cited

U.S. PATENT DOCUMENTS

| 3,050,672 | 8/1962 | Alexanderson | 318/257 |
| 3,119,957 | 1/1964 | Alexanderson | 318/257 |
| 3,181,096 | 4/1965 | Sutton | 318/257 |
| 3,487,279 | 12/1959 | Stringer et al. | 318/257 |
| 3,684,945 | 8/1972 | Hermansson et al. | 318/257 |

Primary Examiner—J. D. Miller
Assistant Examiner—John W. Redman

[57] ABSTRACT

A system for controlling rotational direction switchover and for variably controlling the rotational speed of a motor comprises a circuit for switching over the rotational direction of the motor, a circuit for supplying rotation driving voltage to the motor thereby to drive it at a speed depending on the rotation driving voltage, a single voltage varying unit for varying voltage continuously, and a control signal generation circuit which receives variable voltage from the voltage varying means to generate a rotational control signal for the rotation driving voltage supplying circuit and further to generate a rotational direction switchover control signal for the switchover circuit. The voltage of the rotation control signal produced by the control signal generation circuit decreasing as the variable voltage approaches a predetermined value, reaching a minimum when the variable voltage coincides with the predetermined voltage, and increasing as the variable voltage goes beyond the predetermined value. The rotational direction switchover control signal is produced by the control signal generation circuit when the variable voltage is substantially the predetermined value.

5 Claims, 10 Drawing Figures

SYSTEM FOR CONTROLLING ROTATIONAL DIRECTION SWITCHOVER AND FOR VARIABLY CONTROLLING ROTATIONAL SPEED OF MOTOR

BACKGROUND OF THE INVENTION

The present invention relates generally to a system for controlling rotational direction switchover and for variably controlling the rotational speed of a motor, and more particularly to a system capable of controlling rotational direction switchover and further of continuously and variably controlling the rotational speed of a motor through manual operation of a single control means.

In general, the operation of editing programs comprised of video signals recorded on magnetic tapes is carried out by recording on a new tape in continuous succession the desired program sections among the programs comprised of video signals recorded on one or more original tapes. In editing, the tape recorded with the program video signal to be edited is reproduced on a reproducing apparatus for electronic editing, and the position of the desired section is searched out by observing the reproduced picture. The reproduction is then carried out from the beginning of the desired section, and the resulting reproduced signal is recorded on the new tape by the recording apparatus.

For shortening the time required for locating the position of the desired section and then further locating the beginning of the section and causing the tape to stop at this beginning position on the reproducing apparatus for editing, it is desired that the tape runs at high speeds in the normal and reverse directions and that the tape running speed be reduced near the desired beginning position. For achieving this operation, the tape running speed must be changed during the tape running mode. Moreover, it is difficult to stop the tape at the desired beginning position through a single operation because the beginning position on the recorded tape generally cannot be recognized the moment it passes by. Accordingly, after the initial position on the tape has passed by, the tape runs in the opposite direction at low speed. By repeating this operation, the beginning of the desired program on the tape is located and the tape is finally stopped.

In this connection, the conventional type of reproducing apparatus for editing is provided with a switch button for switching over the rotational direction of a capstan motor for driving the tape to run between the normal rotational direction and the reverse rotational direction, that is, between normal and reverse tape traveling directions, and a plurality of switch buttons are provided for setting the rotational speed of the motor (that is, the tape traveling speed) to, for example, double speed, normal speed, 1/5 speed, 1/20 speed, and the like, so that both the tape traveling direction and the traveling speed can be changed through appropriate manipulation of these switch buttons.

Accordingly, in this known apparatus for editing reproduction, the manipulation of separate switch buttons is required in switching over the tape traveling direction (i.e., the rotational direction of the motor) and in changing the tape traveling speed (i.e., the rotational speed of the motor). Therefore, manual operational control of the conventional apparatus is very troublesome. Further, since the tape traveling speed must be selected among a plurality of preset speeds, the tape traveling speed cannot be varied continuously. Still further, the larger number of switches needed makes the apparatus complicated and expensive.

SUMMARY OF THE INVENTION

Accordingly, it is a general object of the present invention to provide a novel and useful system for controlling rotational direction switchover and variably controlling the rotational speed of a motor, in which the above described difficulties have been overcome.

Another and specific object of the present invention is to provide a system in which not only switchover control between normal and reverse rotational directions of motor but also continuous variable control of the rotational speed of a motor can be effected by controlling a single manual control means.

Still another object of the present invention is to provide a system in which continuous variable control is automatically effected at the time of switching over between normal and reverse rotational directions of a motor through the operation of a single manual control means so that the rotational speed of the motor is reduced before and after the time of switching over. The system of the present invention is particularly effective in a case where it is applied to a capstan motor in a reproducing apparatus for electronic editing to locate a desired position on a tape.

Other objects and further features of the invention will be apparent from the following detailed description with respect to preferred embodiments of the invention when read in conjunction with the accompanying drawings.

DETAILED DESCRIPTION OF THE INVENTION

Figure 1:
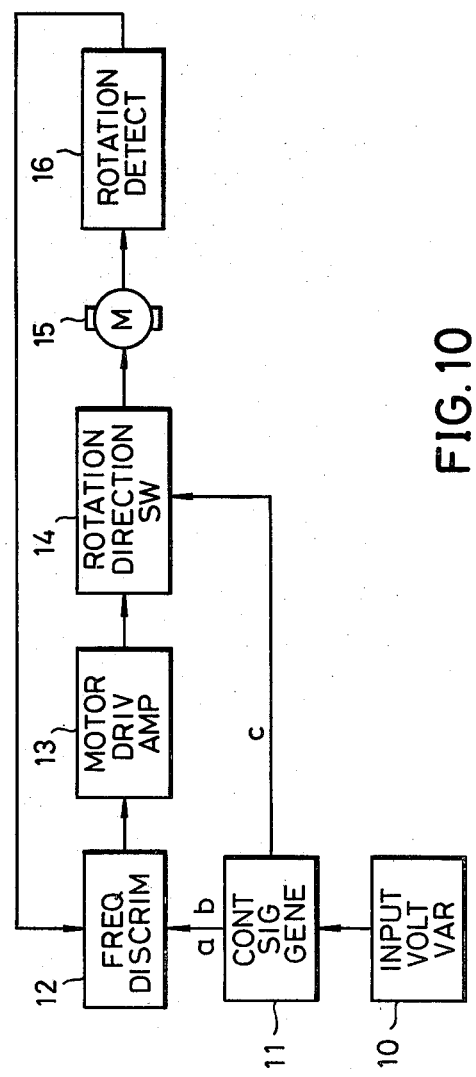
FIG. 1 is a block diagram showing a system for controlling rotational direction switchover and for variably controlling the rotational speed of a motor, according to the present invention.

Referring now to FIG. 1, a general description is given of a system according to the present invention, which system is designed to control switchover of rotational direction and to variably control the rotational speed of a motor.

An input voltage varying unit 10 is capable of continuously varying a voltage to be applied to a control signal generation circuit 11, responsive to manual operation of a single control knob thereof. As will be described in more detail hereinbelow, the control signal generation circuit 11 generates a voltage which decreases as the input voltage increases up to a predetermined voltage and then increases as the input voltage rises above the predetermined voltage. The voltage from the control signal generation circuit 11 is supplied as a rotational speed control signal a to a frequency discrimination circuit 12. Furthermore, this control signal generation circuit 11 produces a rotation stop signal b when the input voltage is near the above described predetermined voltage.

The rotation of a motor 15 is detected by a rotation detector 16, and the resulting detection output is supplied to the frequency discrimination circuit 12, where it is subjected to frequency discrimination. From the frequency discrimination circuit 12 is derived a signal which is the sum of the rotational speed control signal from the control signal generation circuit 11 and the frequency discriminated signal obtained by frequency discriminating the detection signal from the rotation detector 16. The output of the frequency discrimination circuit 12 is amplified in a motor driving amplifier 13, and is then supplied through a rotational direction switching unit 14 to the motor 15, thus controlling the rotational speed thereof. The loop from the rotation detector 16 through the frequency discriminator 12 and the motor driving amplifier 13 to the motor 15 is a well-known constant speed servo loop.

On the other hand, when, due to manual adjustment of the input voltage varying unit 10, the input voltage to the control signal generation circuit 11 comes into the vicinity of the above-mentioned predetermined voltage, the control signal generation circuit 11 generates a rotational direction switching control signal c, which is applied to the rotational direction switchover unit 14. The rotational direction switchover unit 14 operates responsive to this signal c so as to switch over the direction of rotation of the motor 15. Prior to the switchover of the rotational direction by rotational direction switchover unit 14, the motor 15 is first stopped by the rotation stop signal b.

Accordingly, for example as the input voltage from the input voltage varying unit 10 increases progressively, the rotational speed of the motor 15 in the normal direction decreases correspondingly. When the input voltage reaches the predetermined voltage, the rotation of the motor 15 comes to stop and the rotational direction of the motor 15 is switched over. Then, as the input voltage increases further, the rotational speed of the motor 15 in the reverse direction increases gradually. When the input voltage is progressively reduced from its higher value, the result is the reverse of the preceding operation.

Accordingly, in the case where the system of the present invention is applied to a reproducing apparatus for editing video tapes in an electronic manner, the input voltage varying unit 10 is firstly controlled in accordance with the anticipated location of the beginning of the desired program signal on the tape to set the input voltage, whereby the motor 15 for rotating the capstan is rotated at high speed in either normal or reverse direction depending on whether a small or large input voltage has been set. Thus the tape is driven at a high speed in either forward or reverse direction. When the tape approaches the desired beginning position on the tape, the input voltage is varied toward the predetermined voltage, thus causing the rotational speed of the motor 15 to decrease progressively. When the desired beginning position is reached, the input voltage is set to the prescribed voltage to stop the rotation of the motor 15, the tape travel thereby being brought to stop. In the case of an overrun, the input voltage is increased or decreased beyond the predetermined voltage. Responsive to this, the rotational direction of the motor 15 is switched over and the motor 15 resumes rotation in the opposite direction to that in the initial search. In this manner, the tape position is corrected by the length of the overrun so that the tape is stopped precisely at the desired beginning position. The described operation is carried out only by varying the input voltage through manual control of a single control knob, thus affording advantageous features such as extremely simplified operation control.

Figure 2:
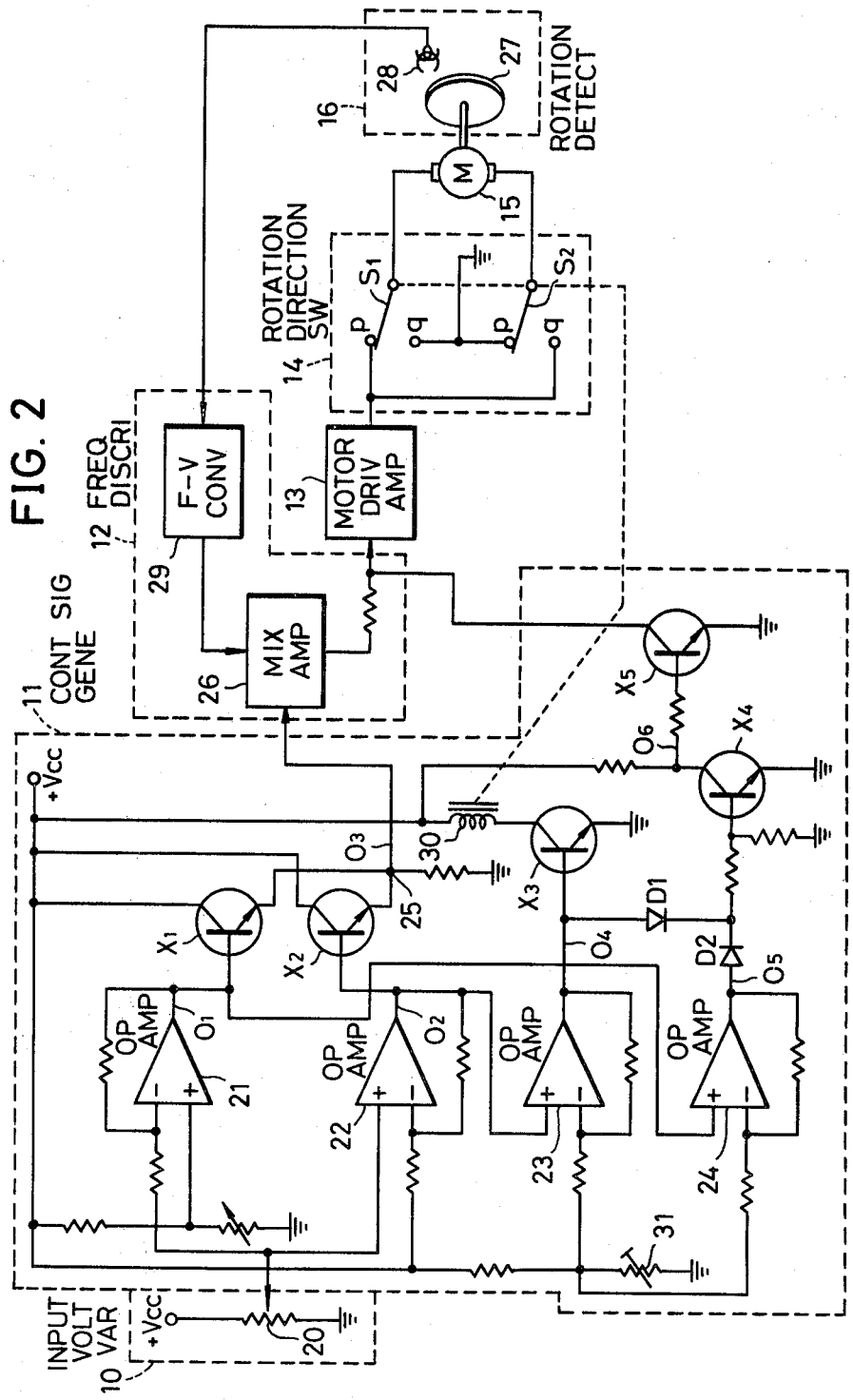
FIG. 2 is a block diagram of one embodiment of a system of the present invention.

Next, a description is given of the circuitry of one embodiment of the system of the present invention, with reference to FIG. 2. Circuit blocks in FIG. 2 which correspond to circuit blocks in FIG. 1 are designated by like reference numerals. The input voltage varying unit 10 comprises a variable resistor 20 one terminal thereof being connected to a power source voltage +Vcc. A slider of the variable resistor 20 is connected to an inversion input terminal of an operational amplifier 21 and to a non-inversion input terminal of another operational amplifier 22.

Figure 3:
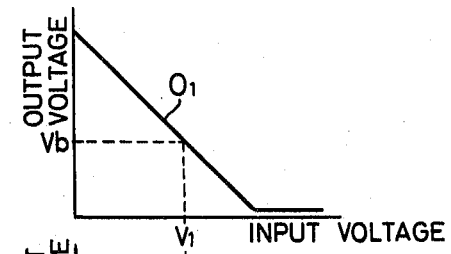
FIGS. 3 through 8 are graphs respectively showing characteristics of output voltage responsive to input voltage, at various points in FIG. 2.
Figure 4:
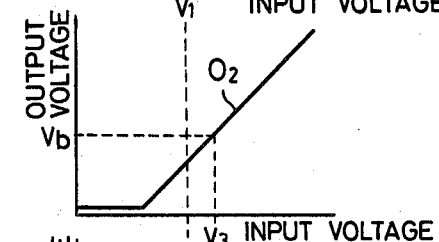

When the control knob of the variable resistor 20 is operated to slide the slider, thus varying the voltage progressively, the input voltage to the operational amplifiers 21 and 22 varies correspondingly. Here, since the operational amplifier 21 operates as an inversion amplifier, the output voltage O1 thereof decreases as the input voltage increases, as indicated in FIG. 3. Moreover, since the operational amplifier 22 operates as a non-inversion amplifier, the output voltage O2 thereof increases with an increase in input voltage, as indicated in FIG. 4.

Figure 5:
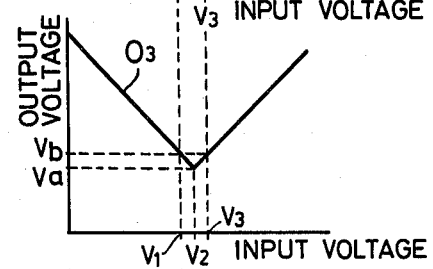

The output voltage O1 of the operational amplifier 21 is supplied to the base of a transistor X1, and the output voltage O2 of the operational amplifier 22 to the base of another transistor X2. The emitters of the transistors X1 and X2 are connected with each other. Accordingly, at a junction 25 of the emitters of the transistors X1 and X2 there appears an output voltage O3 which is the output of whichever of the transistors X1 and X2 has the higher voltage applied to the base thereof. In this connection, the relationship between the output voltage O3 obtained at the junction 25 and the input voltage from the variable resistor 20 is such that the output voltage decreases as the input voltage increases up to the predetermined voltage V2 and then increases as the input voltage increases over the predetermined voltage V2. This relationship is indicated in FIG. 5. An output voltage Va at the predetermined input voltage V2 equals to the output voltage at the intersection of the slant characteristic lines of the output voltages O1 and O2 indicated in FIGS. 3 and 4. The variable resistor 20 is set so that the above mentioned input voltage V2 is obtained when the slide is located at the neutral position.

The voltage O3 is supplied to a mixing amplifier 26. A rotary disc 27 having a permanent magnet is fixed to a rotating shaft of the motor 15, and a pickup head 28 is disposed confronting the rotary disc 27. A rotation detection signal produced as output from the head 28 and corresponding to the rotational speed of the motor 15 is subjected to frequency-to-voltage conversion in an F-V converter 29, which thereby produces a voltage corresponding to the rotational speed of the motor. The output voltage of the F-V converter 29 is supplied to the mixing amplifier 26, where it is mixed with the above described output voltage O3 and is amplified. The resulting output passes through the motor driving amplifier 13 and then through the rotational direction switchover unit 14 composed of switches S1 and S2 which are switched over in intercoupled operation, and thereafter is applied to the motor 15, whereby the rotational speed of the motor 15 is controlled.

The switches S1 and S2 are changed over by a relay coil 30. When the relay coil 30 is deenergized, the switches S1 and S2 are connected to their contact points p thereby to rotate the motor 15 in the normal direction, and when the relay coil 30 is energized as described further below, they are changed over to their contact points q, thus causing the motor 15 to rotate in the reverse direction.

The output voltages O1 and O2 of the operational amplifiers 21 and 22 are additionally applied to non-inversion input terminals of the operational amplifiers 24 and 23, respectively. To inversion input terminals of the operational amplifiers 23 and 24 are applied a reference voltage Vb which is somewhat larger than the above mentioned voltage Va. This reference voltage is set to a prescribed value Vb by adjusting resistance value of the variable resistor 31.

Figure 6:
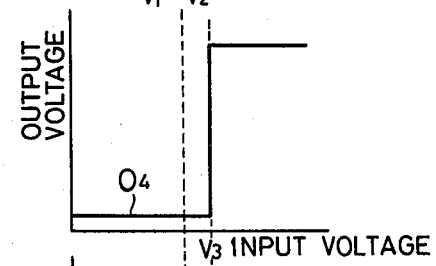
Figure 7:
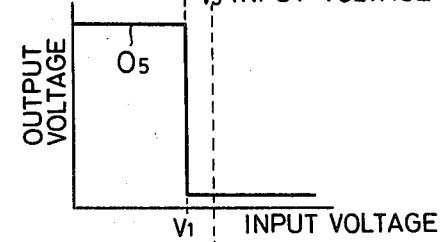

In the operational amplifier 23, the output voltage O2 and the reference voltage Vb are subjected to operation. The operational amplifier 23 thus produces an output voltage O4, which is at a low level when O2<Vb and assumes a high level when O2≧Vb, as illustrated in FIG. 6. The value of the input voltage corresponding to the point where the voltage O4 changes from its low level to its high level is V3. Similarly, the operational amplifier 24 operates on the output voltage O1 and the reference voltage Vb, and thus produces an output voltage O5, which is at a high level when O1≧Vb and assumes a low level when O1<Vb, as illustrated in FIG. 7. The value of the input voltage corresponding to the point where the voltage O5 changes from its high level to its low level is V1.

The output voltage O4 of the operational amplifier 23 is applied to the base of the transistor X3. When the input voltage determined by operation of the slider of the variable resistor 20 is of a value smaller than the voltage V3, the output voltage O4 is at a low level and as a consequence the transistor X3 is unconductive. The relay coil 30 is, therefore, not supplied with current and remains in the deenergized state. The switches S1 and S2 are in contact with their contact points p and the motor 15 is connected to the motor driving amplifier 13 so as to be rotated in the normal direction. When the input voltage exceeds the voltage V3, the voltage O4 becomes high and the transistor X3 is thereby rendered conductive. Accordingly, the relay coil 30 is now supplied with current and is energized, and the switches S1 and S2 are changed over and connected to the contact points q. As a result, the motor 15 is now connected to the motor driving amplifier 13 so as to be rotated in the reverse direction.

Figure 8:
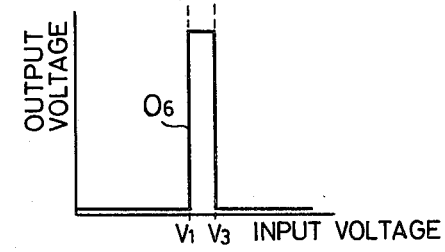

The output voltages O4 and O5 of the operational amplifiers 23 and 24 respectively pass through diodes D1 and D2 and are then applied to the base of a transistor X4. When the input voltage is smaller than the voltage V1, the voltage O5 is at a high level and as a consequence the transistor X4 is in conductive state. The voltage O6 at the collector side of the transistor X4 is of approximately ground potential. Accordingly, a transistor X5, which has its base connected to the collector of the transistor X4, is unconductive. When the input voltage becomes larger than the voltage V1, both the voltages O4 and O5 assume low levels, causing the transistor X4 to be unconductive. The collector side voltage O6 of the transistor X4 therefore becomes high as indicated in FIG. 8, thus causing a transistor X5 to be conductive. The transistor X5 has the emitter grounded and the collector connected to the input side of the motor driving amplifier 13. When the transistor X5 is rendered conductive, the input side of the motor driving amplifier 13 is grounded, and the current to the motor 15 is thereby interrupted. The motor 15 consequently stops.

When the input voltage increases further and exceeds the voltage V3, the voltage O4 assumes its high level, thus causing the transistor X4 to be conductive again, which in turn renders the transistor X5 unconductive. Therefore, the motor 15 is again supplied with current and resumes rotation. By adjusting the value of the above mentioned reference voltage Vb, the range between the input voltages V1 and V3 wherein the rotation of the motor 15 stops can be set as desired.

Therefore, according to the embodiment described above, as the slider of the variable resistor 20 is moved upward from the lower end position where the input voltage is substantially zero to increase the input voltage continuously and gradually, the voltage O3 supplied to the mixing amplifier 26 decreases according to the characteristic curves indicated in FIG. 5. At this time, the rotational speed of the motor 15 rotating at high speed in the normal direction is gradually reduced. When the slider of the variable resistor 20 comes to the neutral point and the input voltage becomes the voltage V1, the transistor X5 is rendered conductive to interrupt driving current to the motor 15, which stops rotation. At input voltages between V1 and V3, the motor 15 stays stopped.

When the input voltage reaches the voltage V3, the transistor X5 is rendered unconductive and the transistor X3 is rendered conductive, thus supplying current to the relay coil 30, which causes the switches S1 and S2 to be changed over to the contact points q. At this time, the voltage O3 is of small value, and the motor 15 thereby resumes rotation at slow speed in the reverse direction. As the slider of the variable resistor 20 is moved further upward, as viewed in FIG. 2, to further increase the input voltage over the voltage V3, the voltage O3 increases gradually following the characteristic curves in FIG. 5, whereby the rotational speed of the motor 15 in the reverse direction increases.

On the other hand, the operation when the input voltage is decreased gradually is the reverse of the operation just described. Accordingly, the operation of sliding the slider of the variable resistor 20 allows the operator to concurrently control the rotational speed and the rotational direction of the motor 15. With this control system, the rotation of the motor 15 is stopped at the time the rotational direction of the motor 15 is switched over and further, the rotational speed of the motor 15 is slow just before and just after switchingover. Therefore, the operation of stopping the tape in the vicinity of the desired position and then of bringing the tape exactly to and stopping it at the position can be carried out very easily and accurately.

In place of the F-V converter 29 and the mixing amplifier 26 in the above described embodiment, a monostable multivibrator may be used. This modification may be made so that the voltage O3 controls the amount of delay in the output signal of the monostable multivibrator, this delay controlling the output voltage.

Figure 9:
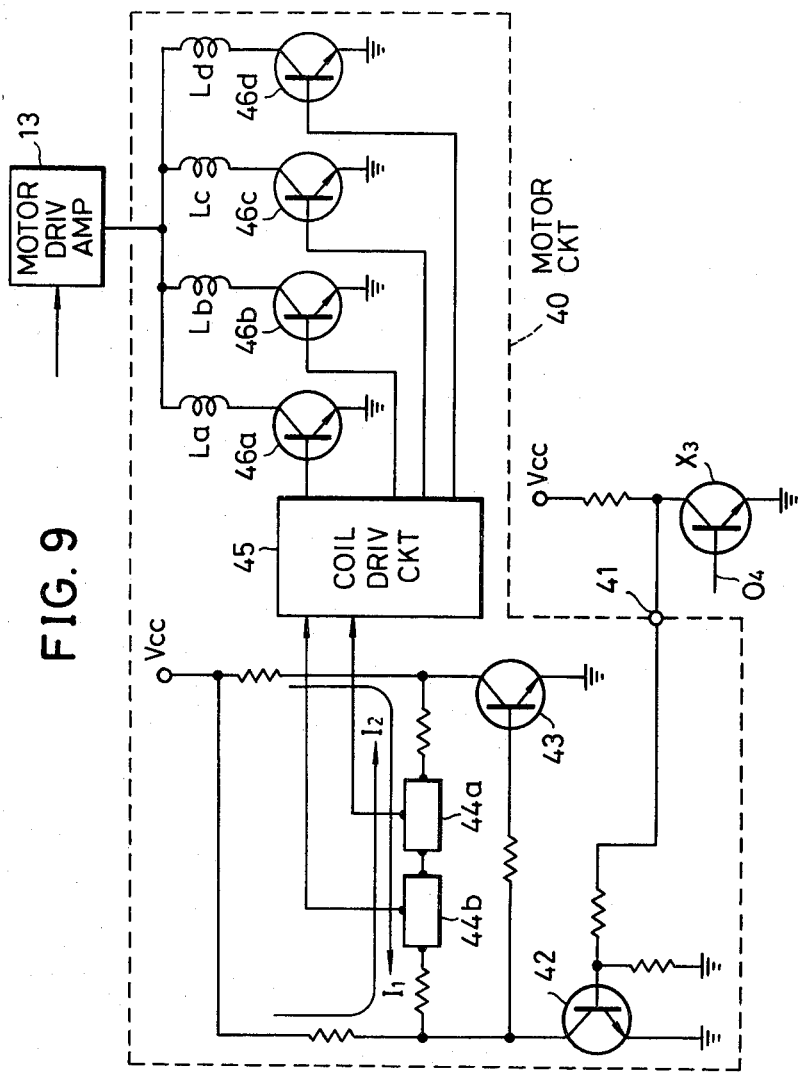
FIG. 9 is a block diagram showing a part of another embodiment of a system of the present invention.

FIG. 9 shows part of another embodiment using a hall-element motor. In this embodiment, the change-over switches S1 and S2, the relay coil 30, and the like provided in the above described embodiment are unnecessary.

When the input voltage is less than the voltage V3, the output voltage O4 is at a low level, and the transistor X3 is kept unconductive. Accordingly, the voltage at a point 41 of a motor circuit 40 connected to both the collector of the transistor X3 and the power source voltage +Vcc is at a high level. Consequently, a transistor 42 of which base is connected to the point 41 is conductive and then the transistor 43 of which base is connected to the collector of the transistor 42 is unconductive. Therefore, a current flows through hall-elements 44a and 44b in the direction indicated by arrow $I_1$. While the current is flowing, the coil driving circuit 45 operates to cause the transistors 46a through 46b to successively assume their conductive states, which in turn allows the current to flow through the field coils La through Ld, in the order La→Lb→Lc→Ld→La. As a result, the rotor of the motor rotates in the normal direction.

When the input voltage exceeds the voltage V3, the output voltage O4 changes to its high level so as to make the transistor X3 conductive. Accordingly, the voltage at the point 41 is at a low level, thus rendering the transistor 42 unconductive and the transistors 43 conductive. As a result, current passes through the hall-elements 44b and 44a in the direction indicated by arrow $I_2$ and the coil driving circuit 45 operates to successively make the transistors 46d through 46a conductive. Therefore, the coils Ld through La are successively supplied with current in the order Ld→Lc→Lb→La→Ld, thus causing the motor rotor to turn in the reverse direction.

Figure 10:
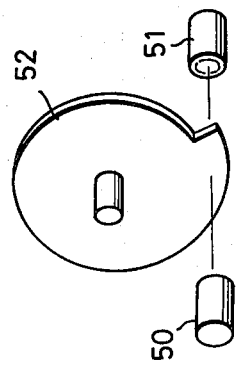
FIG. 10 is a perspective view showing an alternative input voltage varying means.

The input voltage varying unit 10 is not limited to a sliding-type variable resistor but may be a device such as that indicated in FIG. 10. In this device, a light source 50 and a phototransistor 51 which receives light from the light source 50 to generate a voltage proportional to the quantity of radiation are disposed in a face-to-face relationship. A disc 52 is disposed so that the outer peripheral part thereof is interposed between the light source 50 and the phototransistor 51. The disc 52 has such a shape that the radial distance from its rotating center shaft to a point on the outer peripheral edge varies continuously as the point moves along the peripheral edge. In such an arrangement, as the disc 52 is turned by manually operating a knob (not shown), the outer peripheral edge part of the disc 52 cuts off a varying amount of light from the light source 50, whereby the amount of light reaching the phototransistor 51 from the light source 50 undergoes variation. Accordingly, there can be obtained an input voltage which changes continuously as the knob is manually operated.

Further, this invention is not limited to these embodiments but various variations and modifications may be made without departing from the scope of the invention.

What is claimed is:

1. A system for controlling a switchover of rotational directions and for variably controlling the rotational speed of a motor, said system comprising:
   a motor capable of rotating in both a normal direction and a reverse direction;
   means for switching over the rotational direction of said motor;
   means for supplying a driving voltage to said motor, said motor rotating at a speed which depends upon the driving voltage;
   a single voltage varying means for continuously varying a voltage; and
   control signal generating means responsive to a variable voltage from said voltage varying means for generating a rotational control signal and a motor rotation stop signal for controlling said driving voltage supplying means and further for generating a rotational direction switchover control signal for controlling said switchover means, the voltage of said rotation control signal produced by said control signal generating means decreasing as the variable voltage approaches a predetermined value, said rotation control signal reaching a minimum when the variable voltage coincides with the predetermined value, and increasing as the variable voltage goes beyond the predetermined value, the motor rotation stop signal being generated when the variable voltage decreases and reaches substantially the predetermined voltage, and the rotational direction switchover control signal being produced by said control signal generating means when the variable voltage is substantially at said predetermined voltage.

2. A system for controlling a switchover of rotational directions and for variably controlling the rotational speed of a motor, said system comprising:
   a motor capable of rotating in both a normal direction and a reverse direction;
   means for switching over the rotational direction of said motor;
   means for supplying a driving voltage to said motor, said motor rotating at a speed which depends upon the driving voltage;
   a single voltage varying means for continuously varying a voltage; and
   control signal generating means responsive to a variable voltage from said voltage varying means for generating a rotational control signal for said driving voltage supplying means and further for generating a rotational direction switchover control signal for controlling said switchover means,
   said control signal generating means comprising a first circuit means comprising:
   a first operational amplifier having an inversion input terminal coupled to receive the variable voltage, said first operational amplifier generating an output voltage having a voltage value which decreases and increases in response to an increase and a decrease in the variable voltage, a second circuit means comprising a second operational amplifier having a non-inversion input terminal coupled to receive the variable voltage, said second operational amplifier generating an output voltage having a voltage value which increases and decreases with an increase and a decrease in the variable voltage, and a third circuit means comprising first and second transistors having bases which are respectively connected to the output sides of said first and second operational amplifiers and having emitters which are connected to each other, the output voltage of said first and second transistors being the larger value of the output voltages of said first and second circuit means, said third circuit means supplying the output voltage appearing at the junction of the emitters of said first and second transistors as the rotational control signal supplied to said driving voltage supplying means, the voltage of said rotation control signal produced by said control signal generating means decreasing as the variable voltage approaches a predetermined value, said control signal voltage reaching a minimum when the variable voltage coincides with the predetermined value, and increasing as the variable voltage goes beyond the predetermined value, and the rotational direction switchover control signal being produced by said control signal generating means when the variable voltage is substantially at the predetermined value.

3. A system for controlling a switchover of rotational directions and for variably controlling the rotational speed of a motor, said system comprising:
a motor capable of rotating in both a normal direction and a reverse direction;
means for switching over the rotational direction of said motor;
means for supplying a driving voltage to said motor, said motor rotating at a speed which depends upon the driving voltage;
a single voltage varying means for continuously varying a voltage; and
control signal generating means responsive to a variable voltage from said voltage varying means for generating a rotational control signal for said driving voltage supplying means and further for generating a rotational direction switchover control signal for controlling said switchover means, a control signal generating means comprising a first circuit means for generating an output voltage having a voltage value which decreases and increases in response to an increase and a decrease in the variable voltage, a second circuit means for generating an output voltage having a voltage value which increases and decreases with an increase and a decrease in the variable voltage, a third circuit means having an output voltage which is the larger value among the output voltages of said first and second circuit means, said third circuit means supplying its output voltage as the rotational control signal to said driving voltage supplying means, a fourth circuit means for producing an output voltage which assumes a low level when the output voltage of said second circuit means is less than a reference voltage and assumes a high level when said output voltage is more than the reference voltage, the reference voltage being somewhat larger than the output voltage corresponding to the predetermined voltage, and a fifth circuit means for producing the rotational direction switching control signal when the output voltage of said fourth circuit means assumes a high level, the voltage of said rotation control signal produced by said control signal generating means decreasing as the variable voltage approaches a predetermined value, said rotational control signal voltage reaching a minimum when the variable voltage coincides with the predetermined value, and increasing as the variable voltage goes beyond the predetermined value, and the rotational direction switchover control signal being produced by said control signal generating means when the variable voltage is at substantially the predetermined value.

4. A system as claimed in claim 3 in which said control signal generating means further comprises a sixth circuit means for producing an output voltage which assumes a high level when the output voltage of said first circuit means is more than the reference voltage and assumes a low level when said output voltage is less than the reference voltage, and a seventh circuit means for shutting off application of voltage from said rotational driving voltage supplying means to said motor while the output voltages of the fourth and sixth circuit means both assumes a low level.

5. A system as claimed in claim 4 in which said fourth circuit means comprises a third operational amplifier having a non-inversion input terminal applied with the output voltage of said second circuit means and an inversion input terminal applied with the reference voltage, said fifth circuit means comprises a fourth operational amplifier having a non-inversion input terminal applied with the output voltage of said first circuit means and an inversion input terminal applied with the reference voltage, and said eleventh circuit means comprises a transistor circuit for grounding said rotational driving voltage supplying means during a period of time while the output voltages of said fourth and fifth circuit means both assumes a low level.

* * * * *